May 2, 1961 K. WEBERLING 2,982,003

APPARATUS FOR FASTENING MAGNETIC TAPES TO MOTION-PICTURE FILM STRIPS

Filed July 25, 1956 5 Sheets-Sheet 1

May 2, 1961 K. WEBERLING 2,982,003

APPARATUS FOR FASTENING MAGNETIC TAPES TO MOTION-PICTURE FILM STRIPS

Filed July 25, 1956 5 Sheets-Sheet 4

INVENTOR
KURT WEBERLING

BY Toulmin & Toulmin

ATTORNEYS

INVENTOR
KURT WEBERLING

BY Toulmin & Toulmin

ATTORNEYS

United States Patent Office 2,982,003

Patented May 2, 1961

2,982,003

APPARATUS FOR FASTENING MAGNETIC TAPES TO MOTION-PICTURE FILM STRIPS

Kurt Weberling, Munich, Germany (% Eb. Adam, Dandlerstrasse 10, Munich-Obermenzing, Germany)

Filed July 25, 1956, Ser. No. 600,006

Claims priority, application Germany Apr. 5, 1956

14 Claims. (Cl. 29—33)

Figure 1:
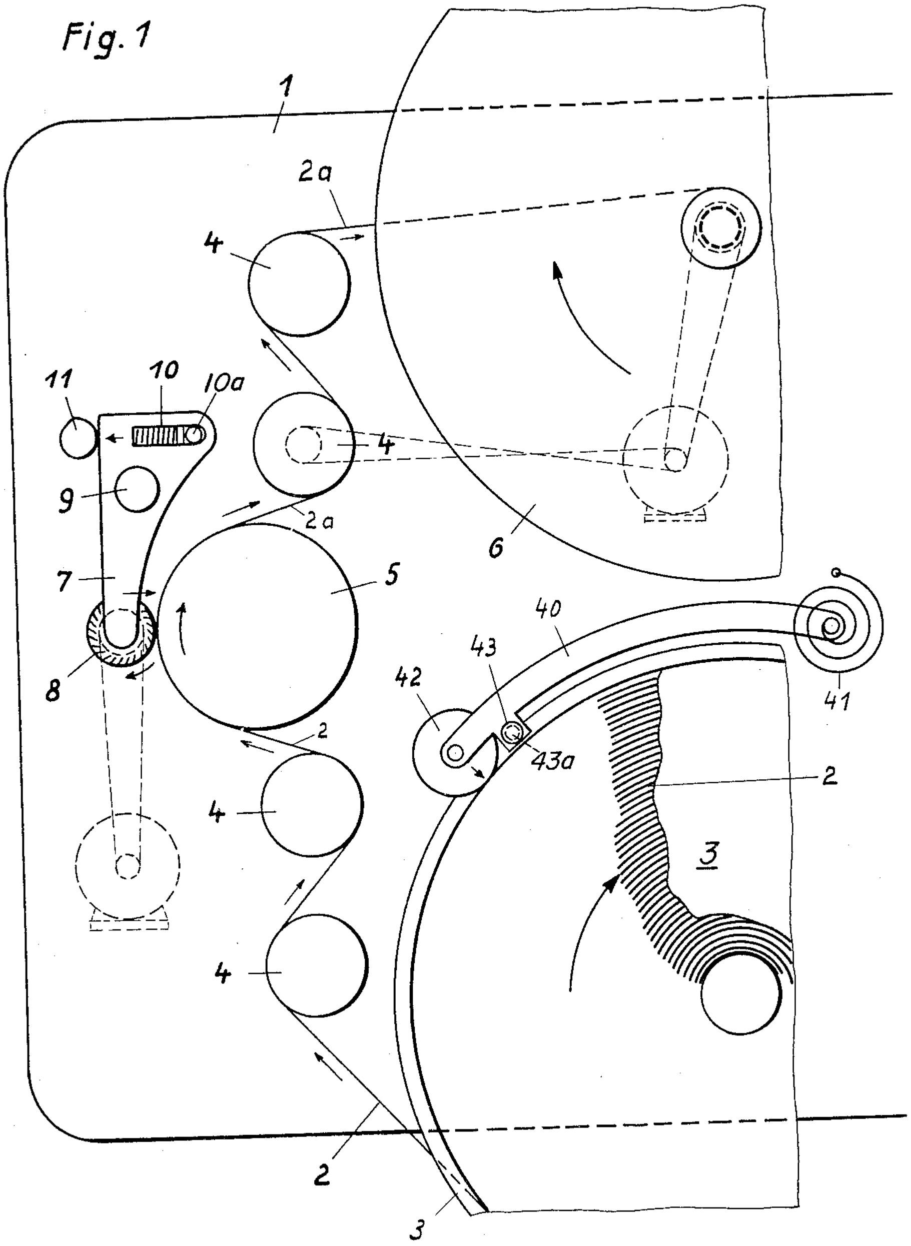

My present invention relates to improved apparatus for fastening magnetic tone bands or tapes to motion-picture film strips.

As known, the system of magnetic sound recording has several marked advantages over that of radiochemical or light-sound recording, and thus is used more and more. Two methods are known for producing the sound track on the film strip. In one of these methods, the sound trace is cast in the liquid state on the film strip, but it is rather difficult to mount it in uniform thickness of only ten microns or so. In such films arise variations caused by irregularities of the sound trace. The latter, furthermore, is not durable and is liable to peel off after prolonged use of the film. Finally, this casting method requires a comparatively expensive installation which only makes itself paid when producing a series of talking pictured films, and this method so far has only been used for three-dimensional sound films involving four sound tracks. In order to obviate the disadvantages of this casting method, it was rather obvious to mount on the film strip a commercial magnetic tape of properly cut width, which ensures a good sound quality and is preserved on the film strip for an unlimited time when securely attached thereto. The execution of this known mounting method, however, brings other substantial difficulties, and it has not been possible so far to satisfactorily mount the tape on the film strip by means which permit to automatically and readily execute the individual operations, as is necessary in order to apply the tape not only to films ready for projection but also to unexposed, highly sensitive panchromatic films in complete darkness, and to enable also semiskilled persons such as are employed, for example, in television studios to operate said means. It is the aim of my present invention to provide such means.

When the magnetic tape has a thickness of up to approximately 50 microns and is applied to the surface of the film strip, the latter at that edge at which the tape is situated, becomes too thick and cannot any longer be firmly wound up and put into conventional casettes. Further, when developing, fixing and washing the film, a magnetic tape fastened to the sensitized side of an unexposed film strip will easily strip off together with the emulsion layer and, therefore, has to be located in a rabbet of the film strip. Aside of the requirement for cutting such rabbet to a depth adjustable for various thicknesses of tape and film strip with an accuracy of a few microns and with a perfectly smooth bottom, there is the further problem of guiding the rabbeting tool automatically over the thickened adhesive joints of a composite film strip, lest the latter at these critical points be damaged or rent by the tool. These tasks are fulfilled by a means disclosed in my present invention, which is mainly characterized in that the rabbeting tool is mounted on a spring-loaded head which is pivotable towards a supporting roller over which the film strip travels, on which head a feeler roller is so mounted in relation to said tool as to lift the latter over thickened film-strip joints. Further features of this means stem from the specification proper.

In order to positively preclude, when cutting the rabbet, any risk of rending at the adhesive joints which as a rule meet the tool on the step side, the steps at the adhesive joints suitably are chamfered prior to the rabbeting operation. This also is of advantage for the reason that, hitherto, in conventional practice, the tape abuts against these steps so that the sound heads which drag on the tape are slightly raised from the latter when passing said joints, whereby a sputtering or clicks are produced. The steps at the film-strip joints according to my present invention are chamfered or beveled by a helical toothed milling cutter mounted on a pivotable spring-loaded head opposite to a supporting roller for the running film strip. Said cutter is driven and continuously adjustable with play above the film strip by angularly moving said head, for example by means of an eccentric. By this means the strength of the film-strip joints may be checked at the same time, by so adjusting the tension of the film strip, for example by a brake acting on the running film, that insufficiently stuck joints are torn loose when passing the cutter. This apparatus comprising a chamfering means and rabbeting means according to the invention performs a preparatory operation which of course would not be required for integral film strips.

After the rabbet has been cut from the film strip, a further means puts the magnetic tape into the rabbet and connects same firmly and free of stresses to the track. This third means essentially is so constructed that the tape which is payed out from a spool via a roller train, is provided with adhesive by an automatic device, then is set into the rabbet of the film strip which runs via a deflection and guide roller, by a transversely adjustable guide member substantially in the direction of the advancing strip, and finally is pressed by one or more spring-loaded rollers against the film strip which runs over a roller train, and begins to dry, the film strip being continuously advanced free of stress by the deflection and guide roller at the commencement of said roller train and a similar roller at the end of the latter. The film strip in turn pulls up the magnetic tape under slight tension.

The three units of the apparatus of the invention are shown, by way of example, in the accompanying drawings, in which—

Figure 2:
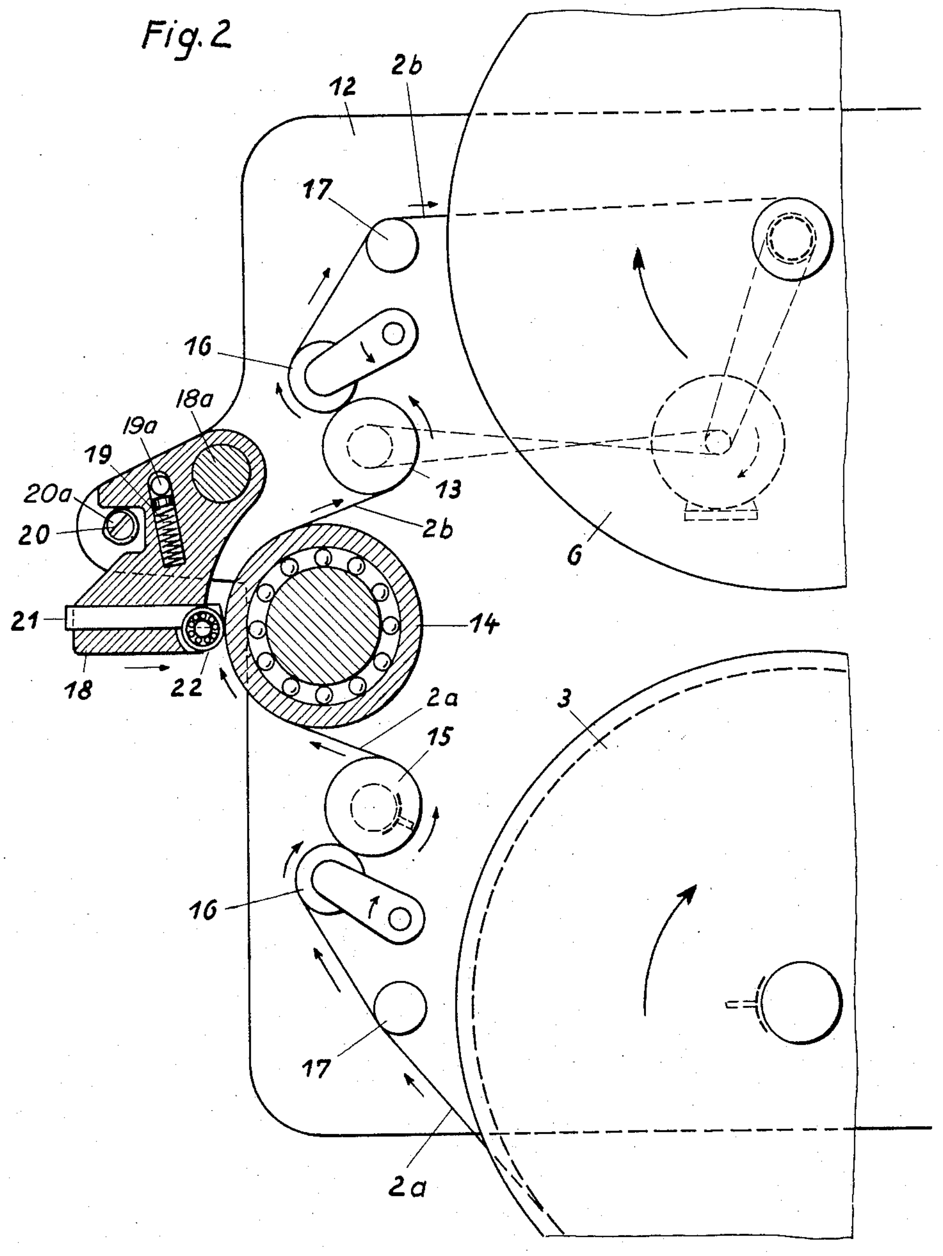
Figures 3, 4:
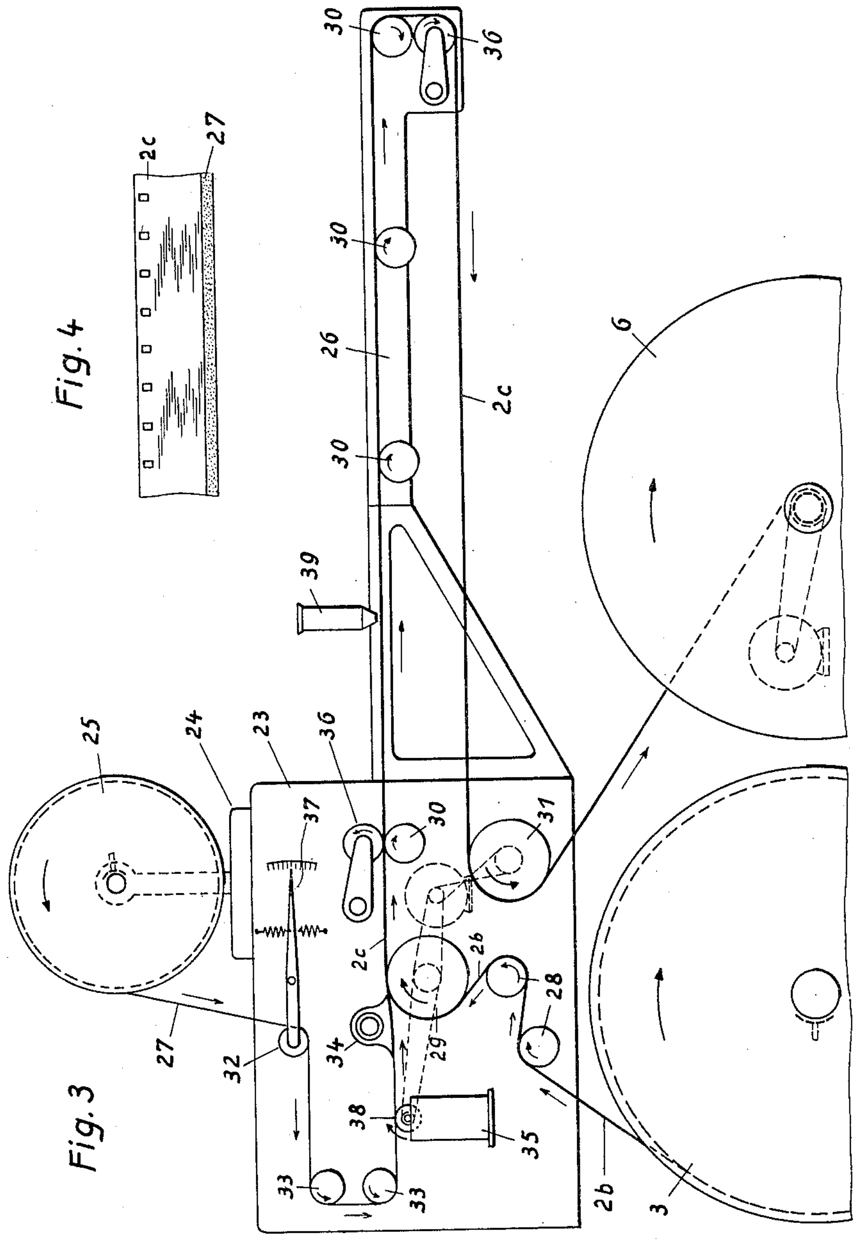
Figure 5:
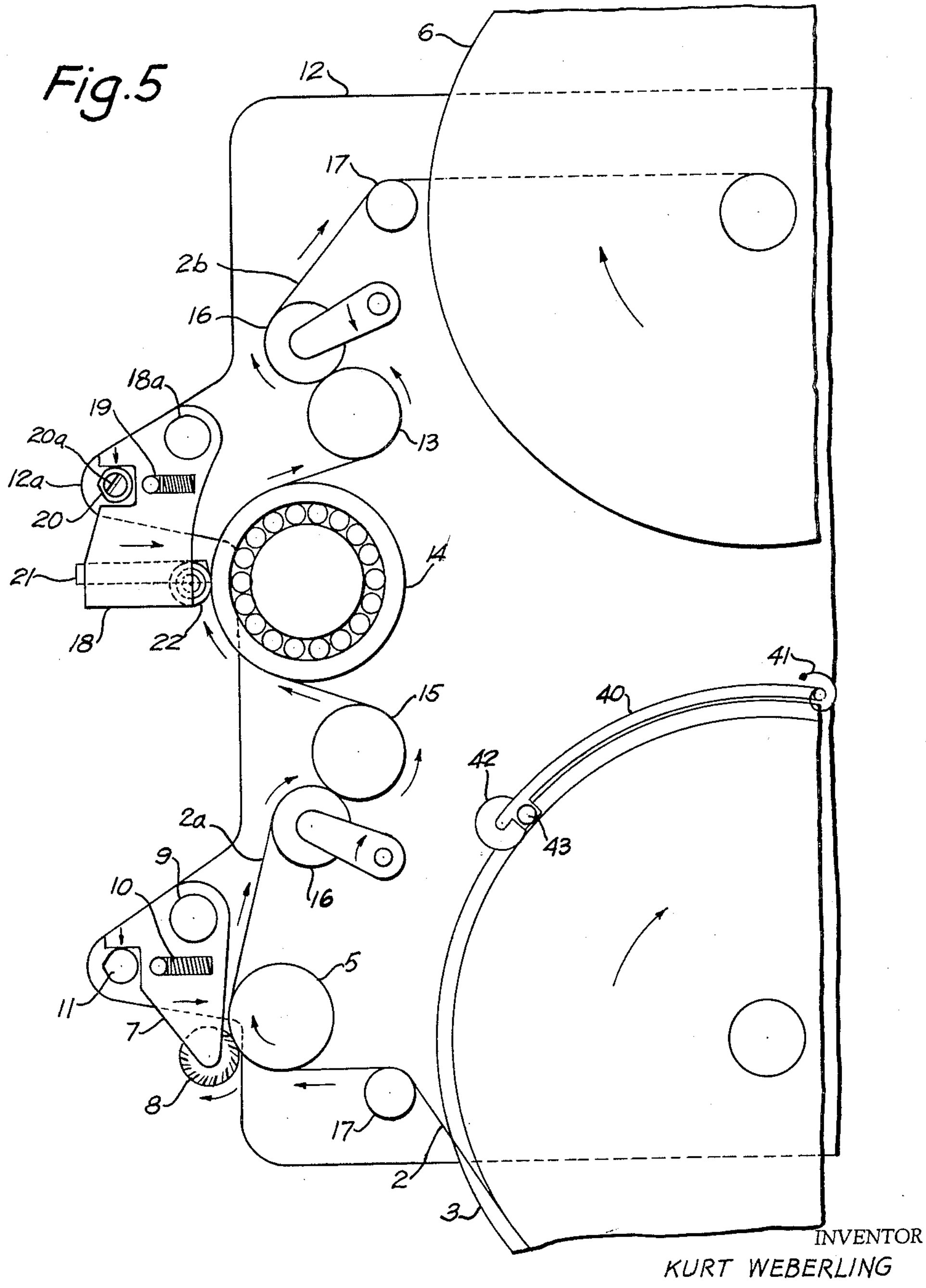
Figure 6:
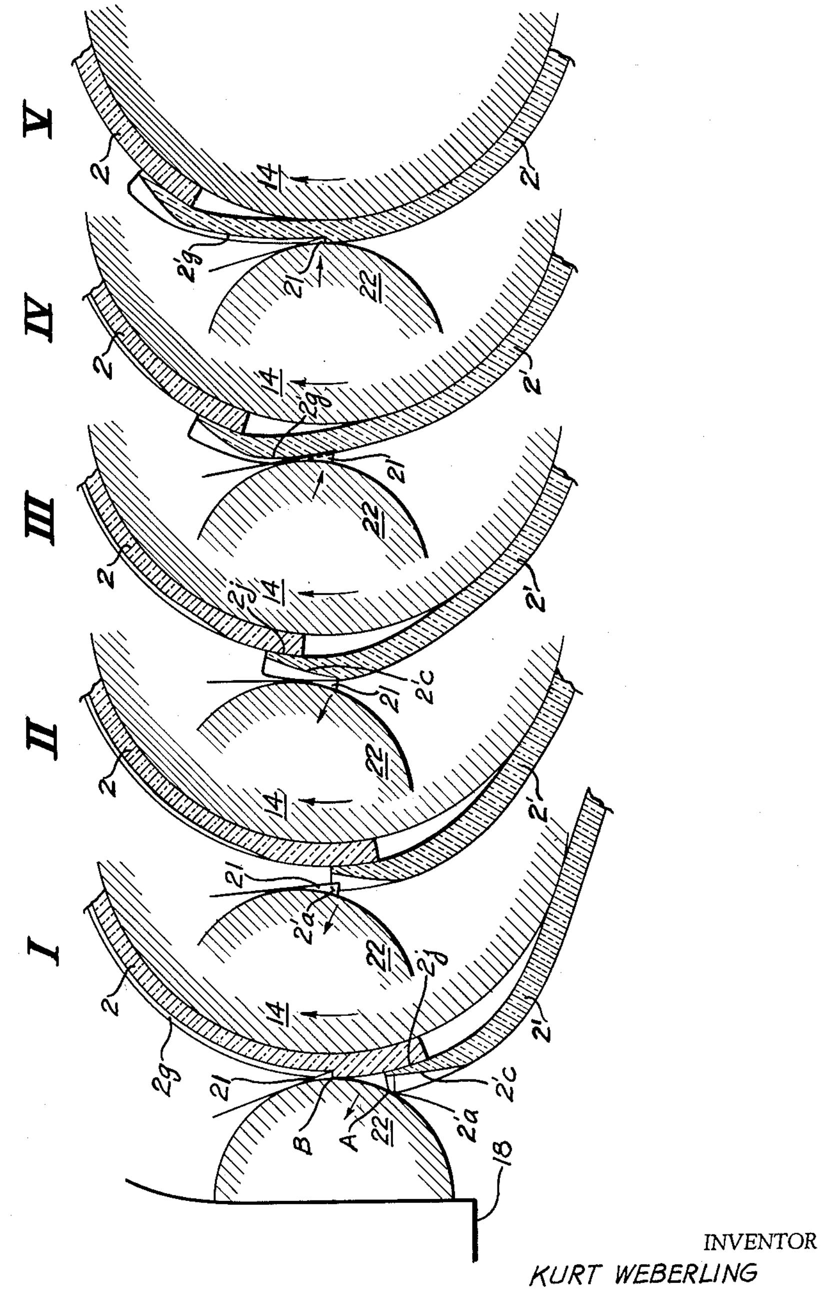

Fig. 1 shows the unit for chamfering the steps at the adhesive joints of a composite film strip, Fig. 2 depicts the film-strip rabbeting unit for providing the tape bed, Fig. 3 illustrates the unit for inserting the tape into the rabbet of the film strip, Fig. 4 shows a plan view of a small film with the tone band or magnetic tape fastened thereto, Fig. 5 illustrates an apparatus according to the invention in which the unit for forming chamfered surfaces at the steps in the adhesive joints of a composite film strip and the unit for rabbeting a groove into the film strip are combined, and Fig. 6 shows five different stages of the cutting operation of the rabbeting unit in the region of an adhesively combined joint between two ends of film forming the composite film strip.

The unit shown in Fig. 1 comprises a housing 1 on the frontside of which are mounted a roller train for the film strip and a tool head, while in the housing is disposed the drive gearing. The film strip 2 runs from the film spool 3 via two deflecting rollers 4, a supporting roller 5 and two further deflecting or guiding rollers 4 on to the film spool 6. Opposite roller 5 is mounted, on a head 7, a driven helical toothed milling cutter 8. Cutter head 7 is pivoted on a pin 9 and is urged against an eccentric 11 by a spring 10 which bears on a pin. By means of said eccentric, cutter head 7 is swung on pin 9 to set cutter 8 over the film strip with so little play that it only engages the raised adhesive joints of the latter in the track which has to be rabbeted later on from the film strip, and cuts off the steps of said joints in that track to form a flat transition from one strip to the other, down to a residual step which corresponds to said play. Concurrently, the strength of said joints may be tested by means of the unit described above. When said joints pass over roller 5, they are subjected to a certain tension which may be so adjusted, for example by means of a friction brake 43 acting on film spool 3, that an insufficiently stuck joint is severed under the additional shock load imparted to it when passing cutter 8.

The following means is provided for maintaining constant the tension of film strip 2 after the friction brake once has been set. To housing 1 is pivoted a lever 40 which on its free end carries a tracer roller 42 which by a spiral spring 41 acting on lever 40 is pressed on to the wound-up film strip 2. Said lever 40 with roller 42 guides the friction brake 43 which engages the wall of spool 3, in radial direction in accordance with the decreasing radius of the wound-up film strip. Friction brake 43 comprises a hollow set-screw screwed into lever 40, and in this set-screw are inserted a spring and a piece of felt which by said spring is pressed against the wall of spool 3. By turning the set-screw, the spring pressure and, thus, the friction force of said piece of felt is varied.

A tape track or bed then is rabbeted from the film strip 2*a* which has been prepared in the manner described immediately above, while simultaneously removing the film emulsion. This operation is performed with the aid of the unit shown in Fig. 2. Here again, film spools 3 and 6, a roller train and a tool head are rotatably and/or pivotably mounted on the front side of a drive-gear housing 12. The film strip 2*a* by means of a driving roller 13 is transported at constant speed over the roller 14 and held under tension by a brake roller 15. The film strip 2*a* bears under adhesive friction on the rubber-coated rollers 13 and 15 and is pressed against same by deflecting rollers 16 in order to increase the adhesive friction and to hold slippage at a minimum, said deflecting rollers being pivotably and resiliently mounted on arms. The rollers 17 complete the roller train. Film spool 6 has a sliding friction drive. Roller 14 is mounted free of play in needle bearings, since the accuracy and evenness of the rabbeted track depend in the first place on this roller 14 but also are attainable by a ground-in journal. A head 18 is pivotably mounted on a pin 18*a* which is rigidly fixed on a projection 12*a* of housing 12. Head 18 is pressed by means of a spring 19 against an eccentric 20. To head 18 there is secured a chisel 21, and a small feeling roller 22 is so mounted in front of the latter that its right-hand vertex, as seen in the drawing, substantially coincides with the cutting edge of chisel 21. In order to obtain an adjustable and constant tension on the film strip 2*b* which is payed out from spool 3, the same means as in the unit shown in Fig. 1 is provided on film spool 3.

Feeling roller 22 may be used as sliding stop on the film strip by letting project the chisel cutting edge beyond roller 22 just for the depth of the rabbet to be cut from the film strip. In this simplified embodiment, eccentric 20 would be unnecessary. In order, however, to avoid any damage to the film strip by this sliding feeling roller, the chisel cutting edge is made to project for a slight play, additional to the cutting depth, beyond the feeler roller so that the latter just does not any longer slide on the film strip, and chisel head 18 is made to abut against eccentric 20 by which and by means of a micrometer screw the cutting depth, taking into consideration the film thickness, may be readily set, substantially more accurately than is possible by resetting the chisel with respect to the feeling roller. The latter here, however, has to raise the chisel automatically over the thickened adhesive joints of the film strip, when the latter is composed of a plurality of pieces. Without this means, the chisel would get stuck at the adhesive joints of which the step sides run up against it, and the film strip would be torn or rent.

When introducing the film strip into the unit shown in Fig. 2, the chisel may be raised from roller 14 by means of a cam provided on eccentric 20. A micrometer screw (not shown) which shifts the chisel head in its pivot axis, permits to set the chisel crosswise of the film strip.

The two units shown in Figs. 1 and 2 respectively, may be combined into a single structure in which the film strip on two separate supporting rollers or on a single supporting roller first passes the milling cutter and then the chisel.

Fig. 5 illustrates the combined arrangement of a milling cutter 8 and accessory rollers and of a rabbeting head 18 bearing a chisel 21 and feeler roller 22 in a single unit so as to operate successively on a composite film strip. Like reference numerals indicate like parts as shown in Figs. 1 and 2.

In Fig. 6 the chisel 21 and feeling roller 22 are shown in cutting operation when passing over the step of an adhesive joint between two film ends or sections 2 and 2′, the joint being indicated by reference numeral 2*j* and the film strip being moved in the direction of the arrow on roller 14. When considering the operation of chisel 21 and feeler roller 22, it must be borne in mind that both these parts are in fixed relationship to each other, but are pivotably displaceable relative to the surface of roller 14 by swiveling about pivot 18*a*, shown in Fig. 2, against the force of spring 19 which urges head 18 and together therewith chisel 21 and feeler roller 22 into contact with the film strip on roller 14. In position I of Fig. 6, the chisel 21 is rabbeting a groove 2*g* into the lower film end 2 of the film strip and in this position the forward edge 2*a* of upper film strip section 2′ is just contacting feeler roller 22 at A while at the same time it is still in contact with the surface of the lower film end 2 at point B. As the film joint at 2*j* moves upward toward the position II of Fig. 6 and due to the rotation of roller 14 in the direction of the arrow on that roller, feeler roller 22 is lifted by edge 2′*a* of the upper film strip section 2′ away from feeler roller 14 and, due to the fact that it pivots about pivot 18*a*, chisel 21 is also tilted away from roller 14 and slightly downwardly from the position it occupied in Fig. 6, position I. While the feeler roller 22 rests on the edge at 2′*a* of strip 2′, the sharp chisel edge of chisel 21 is moved out of contact and passes over the upper film strip section 2′ by way of the chamfered surface 2*c* of the latter. As the overlapping joint 2*j* of film strip sections 2 and 2′ passes over roller 14, as shown in position III of Fig. 6, the sharp edge of chisel 21 contacts the upper end region of the slanted surface of the chamfered surface 2*c* and begins cutting a groove into the outer surface of film strip section 2′.

In position IV of Fig. 6, groove 2*g* is being cut in the surface of film strip section 2′ while the latter is no longer distanced from roller 14 by the thickened joint of overlapping film strip sections 2 and 2′, so that chisel 21 and feeler roller 22 are swiveling back about pivot 18*a* toward feeler roller 14.

Finally, in position V of Fig. 6, film strip section 2′ lies snug against roller 14 and chisel 21 and feeler roller 22 have returned to the original cutting position as occupied by these parts when rabbeting groove 2*g* in film strip section 2 according to position I of Fig. 1.

By means of the unit shown in Fig. 3, the magnetic tape now is fastened to the rabbet. To a drive housing 23 is secured on the top side a pedestal 24 for the tape spool 25 and, on the underside, a pedestal (not shown) for the film spools 3 and 6, and on the right-hand side an extension bracket 26. On the frontside of the housing and bracket 26 are mounted the roller trains for film strip 2b and tape 27. The film strip runs from spool 3 over two deflecting rollers 28, a guide roller 29, a plurality of the 30 and a further deflecting roller 31 on to spool 6, being driven by the two similar rollers 29 and 31. Tape 27 runs from spool 25 via a pivotably mounted roller 32, two deflecting rollers 33 and a guide member 34 on to driving roller 29 and on to the film strip. After its starting end has been stuck on to the film strip 2b, the tape is drawn by the running film strip from its spool over the roller train. By a means 35 the tape is coated with an adhesive on one side, then accurately introduced into the rabbet of the film strip by guide member 34 which is adjustable transversely of the running direction, and finally inserted into the rabbet under slight pressure at a slightly smaller angle than 180° with respect to the progressing film strip. The tape then is pressed on to the film strip 2c by a weighted roller 36 which is pivotally mounted on an arm above a roller 30, and dries in the further course of the film strip. Owing to the double drive by the rollers 29 and 31, the film strip passes over the track defined by said rollers without tension and without elastic elongation. The second roller 36 holds the film strip taut along said track. On the other hand, the magnetic tape joins the film strip 2b under slight tension and free of elastic deformation in the longitudinal and transverse directions. These means produce a firm and strainless connection between film strip and magnetic tape so that the latter cannot become detached and the former cannot become warped and distorted.

The tension of film strip 2b running off from spool 3 and the tension of tape 27 running off from spool 25 here again are brought about by adjustable friction brakes, and held constant during the paying-out or unwinding operation by means similar to those used in the unit shown in Fig. 1. In order to balance variations in the slight tension of tape 27, the latter is deflected by a roller 32 mounted on a spring-loaded lever of which the arm 37 at the same time serves for indicating the tension on a small scale to permit of adjusting and observing the tension.

The pasting means 35 is provided with an adhesive-applying roller 38 which uniformly spreads adhesive on the tape.

The position of the magnetic tape on the film-strip rabbet may be checked by means of a small microscope 39 or a magnifying glass and, if required, may be corrected by shifting the guide member 34.

Not only the two units shown in Figs. 1 and 2, but all of the three units shown in Figs. 1 to 3 may be combined into a single unit, the three operations of chamfering the film-strip joints, rabbeting the tape bed from the film strip, and fastening the tape to the film-strip rabbet being carried out in succession on the film strip which passes over a single roller train.

I claim:

1. In an apparatus for providing composite film strips with magnetic tapes which film strips have adhesively combined joints which form steps in the surfaces of the strips, the improvement comprising, in combination, a milling cutter for forming a chamfered surface in the step at each joint of said composite film strip, and means for rabbeting a bed from said film strip for said magnetic tape, said rabbeting means comprising chisel means for cutting a groove in one of the surfaces of said composite film strip and means adapted for lifting said chisel means off the surface of said composite strip shortly prior to the passage of a joint in the composite strip under the chisel means and setting said chisel means on to the chamfered surface in the step of the respective joint.

2. The improvement described in claim 1 wherein said chamfering means comprise a supporting roller for the passing film strip, a pivotable spring-loaded head, a driven helical toothed milling cutter mounted on said head opposite said supporting roller, and an eccentric disposed to engage said head and swing said cutter into engagement with the film strip.

3. In an apparatus for providing composite film strips with magnetic tapes which film strips form steps in the surfaces of the strips, the improvement comprising, in combination, a milling cutter for forming a chamfering surface in the step at each joint of said composite film strip, and means for rabbeting a bed from said film strip for said magnetic tape, said rabbeting means comprising a pivotable spring-loaded head, chisel means tool mounted on said head, a supporting roller over which said film strip is trained and against which said pivotable spring-loaded head is urged, and a feeling roller mounted on said head and rolling over the periphery of said supporting roller thereby raising said chisel means tool on said head out of contact with the surface of the film strip over the thickened joints of the film strip running over said supporting roller on to the chamfered surface in the step of the joint.

4. The improvement as described in claim 3, said rabbeting means comprising an eccentric resiliently pressed against said head and adapted to adjust said tool to the thickness of said film strip and to the depth of said rabbet, and a cam provided on said eccentric adapted to raise said tool from said film strip on said supporting roller.

5. The improvement as described in claim 3, said rabbeting means further comprising a roller train for transporting the film strip from a pay out spool to a take up spool, comprising said supporting roller, a deflecting roller disposed in advance of said supporting roller and adapted to brake the speed of said film strip and hold said film strip under tension adapted to the cutting resistance of said tool, a second deflecting roller disposed after said supporting roller and adapted to drive said film strip at uniform speed, said deflecting rollers being coated to increase the adhesive friction of said film strip thereon, and a pair of spring-loaded pivotably mounted deflecting rollers disposed in advance of and after said coated rollers, respectively, and urging said film strip onto said coated rollers.

6. An apparatus as described in claim 2, further comprising means for testing the strength of the joints of said composite film strip, said strength testing means comprising a friction brake acting on the film strip pay-out spool and adjusting means for adjusting said brake to cause a predetermined tension of the film strip at which joints of the film strip not having a predetermined strength break while passing said chamfering means.

7. An apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, chisel means adapted for engaging the surface of said film strip on the side opposite said supporting roller and for cutting said groove therein, a rabbeting head mounted in said frame and bearing said chisel means, a feeler roller mounted on said head and adapted for rolling on the surface of said film strip in contact with said chisel means, said feeler roller being in fixed relationship to said chisel means, means for adjusting the normal operating position of said chisel means and feeler roller relative to said supporting roller, and spring means adapted for urging said chisel means and feeler roller into contact with the region of said film strip passing over said supporting roller, said chisel means and feeler roller being so displaceable relative to the surface of said film strip that when one of said steps in the surface of said film strip at a joint of the latter passes said region, the feeler roller is briefly raised away from said supporting roller against the action of said spring so as to lift said chisel means briefly off the surface of said film track.

8. An apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, a chisel means adapted for engaging the surface of said film strip on the side opposite said supporting roller and adapted for cutting said groove therein, a rabbeting head pivotably mounted in said frame and bearing said chisel means rigidly attached thereto, means for adjusting the normal operating position of said head relative to said supporting roller, a feeler roller mounted on said head and adapted for rolling on the surface of said film strip in contact with said chisel means, and spring means adapted for urging said chisel means and feeler roller into contact with the region of said film strip passing over said supporting roller, said chisel means and feeler roller being so disposed in said head relative to the surface of said film strip that when one of said steps in the surface of said film strip at a joint of the latter passes said region, the feeler roller briefly raises said head against the action of said spring so as to lift said chisel means briefly off the surface of said film track.

9. An apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, chisel means adapted for engaging the surface of said film strip on the side opposite said supporting roller and adapted for cutting said groove therein, a rabbeting head pivotally mounted in said frame and bearing said chisel means rigidly attached thereto, cam bearing eccentric means mounted on the frame and adapted for engaging said head and adjusting the normal operating position of said head relative to said supporting roller, a feeler roller mounted on said head and adapted for rolling on the surface of said film strip in contact with said chisel means, and spring means adapted for urging said chisel means and feeler roller into contact with the region of said film strip passing over said supporting roller, said chisel means and feeler roller being so disposed in said head relative to the surface of said film strip that when one of said steps in the surface of said film strip at a joint of the latter passes said region, the feeler roller briefly raises said head against the action of said spring so as to lift said chisel means briefly off the surface of said film track.

10. An apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, a deflecting roller disposed in advance of said supporting roller and adapted to brake the speed of said film strip and hold said film strip under tension adapted to the cutting resistance of said tool, a second deflecting roller disposed after said supporting roller and adapted to drive said film strip at uniform speed, said deflecting rollers being coated to increase the adhesive friction of said film strip thereon, and a pair of spring-loaded pivotably mounted deflecting rollers disposed in advance of and after said coated rollers, respectively, and urging said film strip onto said coated rollers, an apparatus frame housing said film strip and supporting roller, chisel means adapted for engaging the surface of said film strip on the side opposite said supporting roller and for cutting said groove therein, a rabbeting head pivotably in said frame and bearing said chisel means, a feeler roller mounted on said head and adapted for rolling on the surface of said film strip in contact with said chisel means, said feeler roller being in fixed relationship to said chisel means, means for adjusting the normal operating position of said chsel means and feeler roller relative to said supporting roller, and spring means adapted for urging said chisel means and feeler roller into contact with the region of said film strip passing over said supporting roller, said chisel means and feeler roller being so displaceable relative to the surface of said film strip that when one of said steps in the surface of said film strip at a joint of the latter passes said region, the feeler roller is briefly raised away from said supporting roller against the action of said spring so as to lift said chisel means briefly off the surface of said film track.

11. An apparatus for forming a groove destined for the reception of a magnetic sound recording tape in a composite film strip having adhesively combined joints which form steps in the surface of the strip, comprising: a self-contained roller train comprising a pay-out spool for dispensing and a take-up spool for reeling up the film strip and adapted for transporting the film strip from the pay-out spool to the take-up spool, and a supporting roller over which said film strip passes, an apparatus frame housing said film strip, and roller train chisel means adapted for engaging the surface of said film strip on the side opposite said supporting roller and for cutting said groove therein, a rabbeting head pivotably disposed in said frame and bearing said chisel means, a feeler roller mounted on said head and adapted for rolling on the surface of said film strip in contact with said chisel means, said feeler roller being in fixed relationship to said chisel means, means for adjusting the normal operating position of said head relative to said supporting roller, spring means adapted for urging said chisel means and feeler roller into contact with the region of said film strip passing over said supporting roller, said chisel means and feeler roller being so disposed in said head relative to the surface of said film strip that when one of said steps in the surface of said film strip at a joint of the latter passes said region, the feeler roller briefly raises said head against the action of said spring so as to lift said chisel means briefly off the surface of said film track; and tensioning means comprising pivotable lever means associated with said pay-out spool, a friction brake mounted at the free end of said lever means and slidingly engaging the sidewall of said pay-out spool, a feeler roller also mounted on the free end of said lever and engageable with the circumference of the film strip on said pay-out spool, and spring means associated with said lever means for urging said friction brake and feeler roller against said pay-out spool and film strip respectively, thereby maintaining the film strip under a determined constant tension regardless of the thickness of the strip.

12. In an apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, chisel means adapted for engaging the surface of said film strip on the side opposite said supporting roller and for cutting said groove therein, a rabbeting head mounted in said frame and bearing said chisel means, a feeler roller mounted on said head and adapted for rolling on the surface of said film strip in contact with said chisel means, said feeler roller being in fixed relationship to said chisel means, means for adjusting the normal operating position of said chisel means and feeler roller relative to said supporting roller, and spring means adapted for urging said chisel means and feeler roller into contact with the region of said film strip passing over said supporting roller, said chisel means and feeler roller being so displaceable relative to the surface of said film strip that when one of said steps in the surface of said film strip at a joint of the latter passes said region, the feeler roller briefly swivels away from said supporting roller against the action of said spring so as to lift said chisel means briefly off the surface of said film track, the improvement of milling means for forming a chamfered surface at the steps in the surface of the strip at the film joints in the latter upon which chamfered surface the chisel means can be set by the lifting action of said feeler roller.

13. In an apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, chisel means adapted for engaging the surface of said film strip on the side opposite said supporting roller and for cutting said groove therein, a rabbeting head mounted in said frame and bearing said chisel means, a feeler roller mounted on said head and adapted for rolling on the surface of said film strip in contact with said chisel means, said feeler roller being in fixed relationship to said chisel means, means for adjusting the normal operating position of said chisel means and feeler roller relative to said supporting roller, and spring means adapted for urging said chisel means and feeler roller into contact with the region of said film strip passing over said supporting roller, said chisel means and feeler roller being so displaceable relative to the surface of said film strip that when one of said steps in the surface of said film strip at a joint of the latter passes said region, the feeler roller briefly swivels away from said supporting roller against the action of said spring so as to lift said chisel means briefly off the surface of said film track, the improvement of means for forming a chamfered surface at the steps in the surface of the strip at the joints in the latter, upon which chamfered surface the chisel means can be set by the lifting action of said feeler roller, said chamfering means comprising a second supporting roller in said roller train, a milling cutter on the side of film strip opposite said second supporting roller, a head bearing said milling cutter and being pivotably mounted in said frame, spring means for urging said milling cutter into engagement with the surface of said film strip, and cam-bearing adjustable stop means for limiting the engagement of said milling cutter with said film strip surface to the region behind the strips formed in said surface at the joints of the composite strip.

14. An apparatus for forming a groove destined for the reception of a magnetic sound recording tape in a composite film strip having adhesively combined joints which form steps in the surface of the strip, comprising a self-contained roller train for transporting the film strip from a pay-out spool to a take-up spool, a supporting roller over which said film strip passes, an apparatus frame housing said film strip and supporting roller, chisel means adapted for engaging the surface of said film strip on the side opposite said supporting roller and for cutting said groove therein, a rabbeting head mounted in said frame and bearing said chisel means, a feeler roller mounted on said head and adapted for rolling on the surface of said film strip in contact with said chisel means, said feeler roller being in fixed relationship to said chisel means, means for adjusting the normal operating position of said chisel means and feeler roller relative to said supporting roller, and spring means adapted for urging said chisel means and feeler roller into contact with the region of said film strip passing over said supporting roller, said chisel means and feeler roller being so displaceable relative to the surface of said film strip that when one of said steps in the surface of said film strip at a joint of the latter passes said region, the feeler roller briefly raises away from said supporting roller against the action of said spring so as to lift said chisel means briefly off the surface of said film track, tensioning means comprising pivotable lever means associated with said pay-out spool, a friction brake mounted at the free end of said lever means and slidingly engaging the side wall of said pay-out spool, a feeler roller also mounted on the free end of said lever and engageable with the circumference of the film strip on said pay-out spool, and spring means associated with said lever means for urging said friction brake and feeler roller against said pay-out spool and film strip respectively, thereby maintaining the film strip under a determined constant tension regardless of the thickness of the strip, the improvement of milling means for forming a chamfered surface at the steps in the surface of the film strip at the joints in the latter upon which chamfered surface the chisel means can be set by the lifting action of said feeler roller, said milling means being spring mounted so as to cause said film strip to break at a faulty joint.

References Cited in the file of this patent

UNITED STATES PATENTS

| | | |
|---|---|---|
| 1,205,128 | Mackintosh | Nov. 14, 1916 |
| 1,245,594 | Johnson | Nov. 6, 1917 |
| 1,453,042 | Dugan | Apr. 24, 1923 |
| 1,692,755 | Mix et al. | Nov. 20, 1928 |
| 1,776,353 | Dunbar et al. | Sept. 23, 1930 |
| 1,829,912 | Shearer | Nov. 3, 1931 |
| 2,015,134 | Bates et al. | Sept. 24, 1935 |
| 2,028,053 | Errig | Jan. 14, 1936 |
| 2,048,361 | Stevens | July 21, 1936 |
| 2,335,196 | Pecsok | Nov. 23, 1943 |
| 2,374,103 | Johnson | Apr. 17, 1945 |
| 2,480,162 | Rath | Aug. 30, 1949 |
| 2,484,619 | George | Oct. 11, 1949 |
| 2,678,693 | Kusiv | May 18, 1954 |